US007895139B2

(12) United States Patent
Sullivan et al.

(10) Patent No.: US 7,895,139 B2
(45) Date of Patent: Feb. 22, 2011

(54) DATA SPIDERS

(75) Inventors: Gary J. Sullivan, San Francisco, CA (US); Helen Geraldine E. Rosario, Chapel Hill, NC (US); Michael S. Sossi, San Francisco, CA (US); Christopher Ralph, Toronto (CA); John Duchnowski, Richmond, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 629 days.

(21) Appl. No.: 11/877,626

(22) Filed: Oct. 23, 2007

(65) Prior Publication Data
US 2008/0177681 A1 Jul. 24, 2008

Related U.S. Application Data

(60) Provisional application No. 60/886,061, filed on Jan. 22, 2007.

(51) Int. Cl.
*G06N 5/00* (2006.01)
(52) U.S. Cl. ............................................. 706/14; 706/45
(58) Field of Classification Search .................. 706/14, 706/45
See application file for complete search history.

(56) References Cited

PUBLICATIONS

Ko, et al, Discovery of User Preference through Genetic Algorithm and Bayesian Categorization for Recommendation, Lecture Notes in Computer Science, 2002, vol. 2465/2002, pp. 471-484.*
Ralph, Christopher, "Data Spiders: Leveraging Transactional Data with Genetic Algorithms.," Fair Isaac Corporation, Sep. 5, 2003.
Ralph, Christopher, "Data Spiders: Leveraging Transactional Data with Genetic Algorithms.," Fair Isaac, May 2004.
Ralph, Chris, "Data Spiders: Leveraging Transaction Data to Boost Marketing Results" Fair Isaac Oct. 5, 2005.
Fair Isaac, "Viewpoints," Oct. 5, 2005 http://www.fairisaac.com/NR/exeres/04E0F60D-2020-4EF7-935D-7D19FB8D05FD.frameless.htm.

* cited by examiner

*Primary Examiner*—Wilbert L Starks, Jr.
(74) *Attorney, Agent, or Firm*—Mintz, Levin, Cohn, Ferris, Glovsky and Popeo, P.C.

(57) ABSTRACT

Data spiders, provide an automated system that can take a file or file store of historic transaction data and create the best set of variables from that data, where "best" means highly predictive. Genetic algorithms are used to parameterized transactions to form groups, which are subjected naïve Bayes score ranking. Variable groups are generated and ranked accord to the score. Data spiders span the full information available, are uncorrelated with previous methods, and are easily interpretable.

23 Claims, 10 Drawing Sheets

| Transaction date | Rollup | Matchkey | |
|---|---|---|---|
| 18 Dec 2004 | 001 | 0010008 | History that is too recent to use |
| 15 Nov 2004 | 001 | 0010007 | |
| 01 Nov 2004 | 001 | 0010006 | Trigger transaction |
| 24 Oct 2004 | 001 | 0010005 | History that will be used |
| 03 Oct 2004 | 001 | 0010004 | |
| 14 Mar 2004 | 001 | 0010003 | |
| 10 Mar 2004 | 001 | 0010002 | |
| 08 Mar 2004 | 001 | 0010001 | |

FIG. 10

DATA SPIDERS

CROSS-REFERENCE TO RELATED APPLICATIONS

This application claims the benefit of the following earlier-filed U.S. Provisional Application No. 60/886,061 filed Jan. 22, 2007. The entirety of the foregoing application is incorporated herein by reference.

BACKGROUND OF THE INVENTION

1. Technical Field

The invention relates generally to transactions data mining. More particularly, the invention relates to a method for leveraging existing transactional data with genetic algorithm methodology to create highly predictive sets of variables spanning all of the available data.

2. Background

A business decision must be made that requires an estimate of some future event. The solution offered today is simplified to the process of brainstorming and programming.

Thus, group of analysts gathers to brainstorm for variables and operators. A potential list of variables is made and programming specification are written. Variable generation code follows with the usual development cycle. The code is audited and the full analytic dataset is created. Analysis may reveal new variables to add, which triggers an analytic dataset that is recreated until the project schedule expires, or the analyst/programmers expire or resources are exceeded.

The downside or cost of brainstorming and programming in this fashion is that it is a very labor-intensive process. The analytic datasets are limited generally to about 600 variables. Analysts and programmers run into fatigue, project schedules slip, and more is too many variables to handle, let alone analyze. This limits the investigation possible. Other problems result. Knowledge transfer across projects depends on brainstorm success which is not attained, results do not appear data driven, and the questions and more issues ensue.

The business problem to be solved can be something having to do with cost issues such as: 1) chances of bankcard transaction fraud; 2) chance that this Internet purchase is going to be fraudulent; 3) chances that this Web site visitor is going to buy something; 4) chances that this consumer defaults on a new loan for which they are applying; and 5) chances that this consumer is going to accept this offer. The ability to hedge on these kinds of issues informs the decision-maker.

A business decision estimate can be improved by mining transaction data for predictor trends in the target area. What is needed are better and faster ways of using transaction data to inform decision makers by leveraging the available transaction data with less labor intensive methods, i.e. methods that can span the full datastore, not just the data humanly foreseeable to be the most valuable from the onset.

SUMMARY OF THE INVENTION

The invention provides a method of data mining transactional data systematically and exhaustively through data spiders that implement genetic algorithms. This is accomplished through programmatically creating groups from transaction summary templates of transaction event type variables associated with transaction time-period type variables from an available pool of customer attributes, thus developing sets of target variables. A naïve Bayes model is used to calculate score cards for each group, determining group divergence by naïve Bayes scores, and compiling scorecards that quantify the divergence. The divergence measures the ability of a naïve Bayes score to separate two outcome classes of a binary target variable. The fitness of each group is determined by the quantified divergence of the naïve Bayes score, wherein a ranking the groups by fitness is made, from highest to lowest divergence. Elite, top ranking groups, are identified for use in following generations, iteratively performing the following sequence of steps until the fitness measure of the pre-set top ranking number of groups does not change appreciably. These steps comprise; 1) selecting parent groups based on fitness, wherein parent groups are cloned elites from a previous iteration; 2) determining and creating children groups, wherein children groups are the present iteration variable group combination of two parent groups; 3) determining and mutating children groups, wherein mutating groups are a pre-set fraction of children groups with at least one altered parameter value per group; 4) merging the parent groups and children groups; 5) determining and assigning fitness of each group; 6) ranking the groups by fitness; and 7) tagging the top ranking groups as elite groups to be promoted to the next iteration without further changes. The groups of transaction variables using analogous genetic processes are iteratively valued, scored, and ranked for a particular mathematical score of fitness, progressively maintaining top ranking groups, while introducing mutating groups results in an automated process of comprehensively mining the transaction data for predictors of a specified target objective.

BRIEF DESCRIPTION OF THE DRAWINGS

FIG. 10 is a table showing clock trigger organization in accordance with an embodiment of the invention.

DETAILED DESCRIPTION OF THE INVENTION

Transactional data takes on several forms and present its own challenges. Transactional data comprises records of events over time associated with a customer or account. Transactional data can be simply records of events over time, for which the number of transaction records attached to a consumer varies from one consumer to another. One transaction might be attached to more than one consumer, so there is not a simple one-to-one mapping. In programming a solution, the structure of a transaction record varies from one file to the next, but within a single file the structure is fixed.

Some of these challenges and shortcoming are overcome through the use of data spiders. Data spiders are an automated system that can take a file or file store of historic transaction data and create the best set of variables from that data, where "best" means highly predictive. Other criteria are that the method span the full information available, that it be uncorrelated with previous methods, and that it be easily interpretable.

Examples for generated variables from transactions data are
# of gas station purchases in last 24 hours
Time since address last changed on account
Maximum delinquency in last 36 months
Total balance on newly opened bankcards
declined purchases for this consumer last 7 days
Price of most expensive item in order
% time spent viewing on-line product catalog
Ratio of cash advances to balances last 6 months The vast number of possible variables has prompted the development of variable templates. That is, transactions have been parameterized into parameter variables and groups of these, the most useful being in the form of variable templates.

Variable Templates

Figure 1:
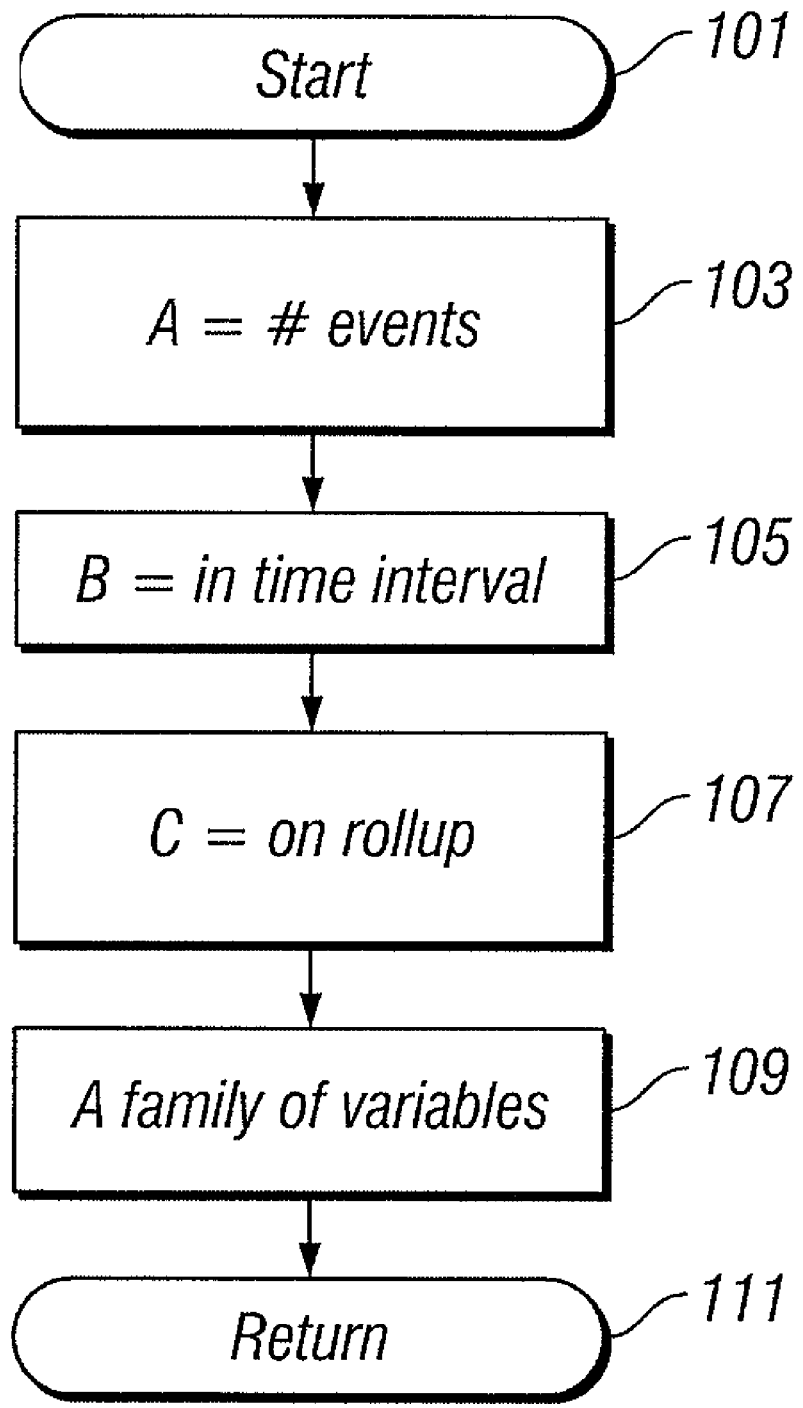
FIG. 1 illustrates the building of a transaction variable template in accordance with an embodiment of the present invention.

FIG. 1 illustrates the components and building of a transaction variable template. Variable templates are a language for describing a family or group of variables. An example for a variable template family at start 101 is encapsulated by the formula for the family 109 of variables:

event=A in time=B based on rollup=C

A 103 is and event-type, from a typical set of variables such as {order accepted, order declined, return, charge-back, one of 20 product groups}

B 105 is a period type variable, from a typical set of variables such as {last 3 hours, 24 hours, 3 days, 7 days, . . . , 30 days, 45 days, 60 days, 90 days} (7 groups)

C 107 is a target reference type or rollup variable, from a typical set of variable such as {full name, credit card #, phone #, ZIP code, email address, domain name, etc.} (11 groups)

The number of unique various groups in the family 109 from just these example sets of variables can be 24*7*11=1, 848 groups. This is a comprehensive grouping that can be reduced as will be shown by some embodiments of the invention.

Further processing of variable templates is problematic because of changes that are inherited by objects using a common Template class. Thus, in another embodiment of the invention, code generation for templates is based on transaction description, where a grammar is defined and the code generation of templates is then done dynamically through lexical and parser tools. Thus, computer source code generation of templates becomes a part of the data spider process.

Basic Search Strategy

The basic search strategy then uses genetic algorithms to search through variable space, finding the best variables per template. Then, a search for best group of variables across templates further filters the variable space.

Reducing the Number of Unique Values

In some applications, the event variables contain so many unique values that the genetic algorithm implementing the search process converges sub-optimally, too long, or prematurely. For example, some credit card transactions may contain thousands of unique merchant category codes associated with customer purchases. However, these occur only a small fraction of the time and can take up needless processing time. In an embodiment of the invention, the event variables in the raw data transaction are pre-processed into categorical event variables.

Working with all possible summary characteristics by the manual method is impossible and, even in automated fashion, this posses many challenges. In another embodiment, event variables are grouped together based on frequency of occurrence, rank on an external measure, correlation, or similarity. Templates have been pre-built based on experience in application domains areas, where this methodology can be applied with advantage.

The function $f$ specifies the characteristics in transactions. In data spiders, $f$ is actually a family of functions, each of which takes a fixed number of parameters, including parameters specifying specific event variables, amount variables, and time periods. These were derived by sifting through existing population of transaction summary characteristics, extracting their commonalties, and classifying as many as possible into a finite number of forms which are available for use.

Examples of instantiated variable templates are
Template 001: The number of occurrences of an event since a time
Parameters: event1, time1
Description: The number of times when event1 was event1 value in the last time1 time units.
Usage: The number of times when Purchase Type was Hardware in the last 7 days Template 002: The average of an amount for an event since a time.
Parameters: event1, time1 amount1
Description: The average of the value of amount1 when event 1 was event1 value within the time1 time units
Usage: The average of the value of TransactionAmount when PurchaseType was Hardware in the last 7 days.

FIG. 1 illustrates the building of a transaction variable template.

The summaries of a template are then evolved. An example of transaction summary variables is the count of event-type transactions in the last time-period, where the event-type and time-period transactions are randomly chosen from the available pool, resulting in specific characteristics such as:
The count of gas station transactions in the last week
The count of grocery store transactions in the last month
The count of on-line transactions in the last year Data spiders currently have a defined template from which users can specify a subset of templates to use in the evolution of transaction summary characteristics. A full data spiders run actually consists of a separate genetic algorithm run for each selected template, plus a final run that uses the best of the characteristics found in each template run. The final result is the set of characteristics in the best of the scorecards evolved in the final pass.

Genetic Search Component

The term evolving means using genetic algorithms to search through the variable space, and finding the best variable per template. Then, the search for best group of variables across templates for a summary characteristic predictive of the solution follows. Generally, this methodology consists of building blocks, which are recombined to create new solutions, which use a measurable fitness criteria to find solutions for non-differentiable fitness functions employing the simple operators from genetics, e.g. natural selection, crossover, and mutation.

Natural Selection: Solutions with the highest fitness should be the most likely to survive over time.

Crossover: Parent solutions need to be able to mate and re-combine their building blocks to create potentially stronger children.

Mutation: Some random mutation of building blocks helps ensure successive generations continue to improve fitness.

Data Spiders Genetic Algorithm Search Architecture

Figure 2:
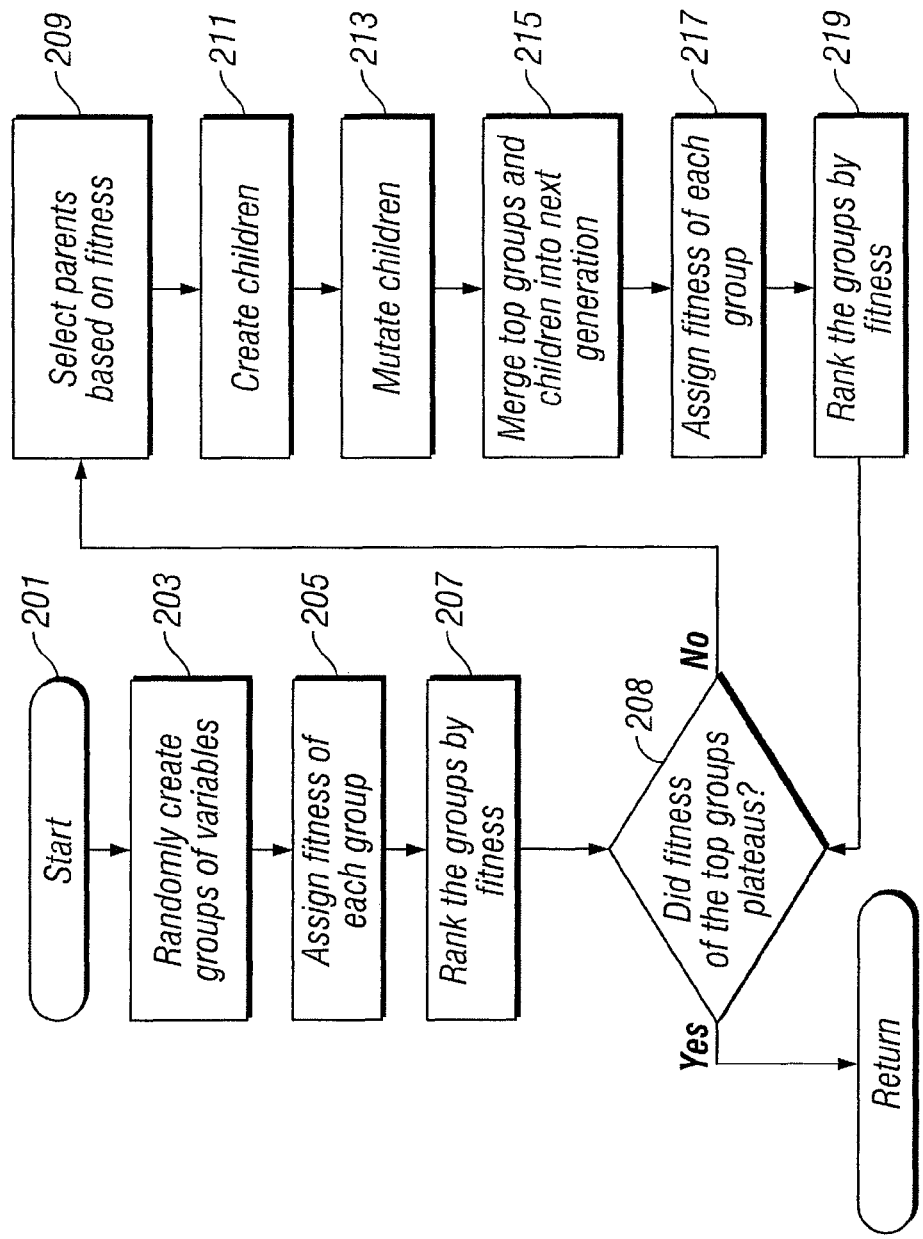
FIG. 2 is a high-level block flow diagram illustrating the Data Spider search architecture in accordance with an embodiment of the invention

FIG. 2 is a high-level block flow diagram illustrating the data spider search architecture in accordance with an embodiment of the invention. The methodology of data mining transactional data through data spiders implements genetic algorithms. This methodology programmatically creates groups of variables from parameterized transactional data; applies a naïve Bayes model to calculate score cards for each group; determines group divergence by naïve Bayes scores; compiles scorecards quantifying the divergence, wherein divergence measures the ability of a naïve Bayes score to separate two outcome classes of a binary target variable; determines the fitness of each group by the quantified divergence of the naïve Bayes score; ranks the groups by fitness, from divergence score; tags elite groups based on top ranking groups for promoting to next iteration; and then, iteratively performing the following sequence of steps until the fitness measure of the pre-set top ranking number of groups does not substantively change. These steps comprise: selecting parent groups based on fitness, wherein parent groups are cloned elites from a previous iteration; creating children groups, wherein each children is a present iteration variable group combination of two parent groups; mutating children groups, wherein each mutating group comprises a pre-set fraction of children groups with at least one altered parameter value per group; merging the parent groups and children groups; assigning a fitness value of each group based on divergence value; ranking the groups by fitness values; and tagging the top ranking groups as elite groups to be promoted to the next iteration.

In this fashion, groups of transaction variables using analogous genetic processes, iteratively valued, scored and ranked for a particular mathematical score of fitness, progressively maintaining top ranking groups, while introducing mutating groups, results in an automated process of comprehensively mining the transaction data for predictors of a specified target objective.

The process is illustrated in FIG. 1 and begins 201 for each variable template by creating groups of variables 203 from parameterized transaction data, assigning fitness of each group 205 and then ranking the groups by fitness 207. The process thread then loops until the fitness of the top groups plateaus 208, or changes little. If there is still change in the top groups, parent groups are selected based fitness rank 209, children groups are created 211, children are mutated 213, and the top groups are merged with the children 215 for inclusion into the next generation, loop iteration. Each group is assigned a fitness value 217 and ranked by fitness 219. This is then compared with the previous generation for any changes in top group ranking 208. Changes indicate a plateau has not been reached and another generation is likewise generated.

Randomly Create Groups of Variables

Figure 3:
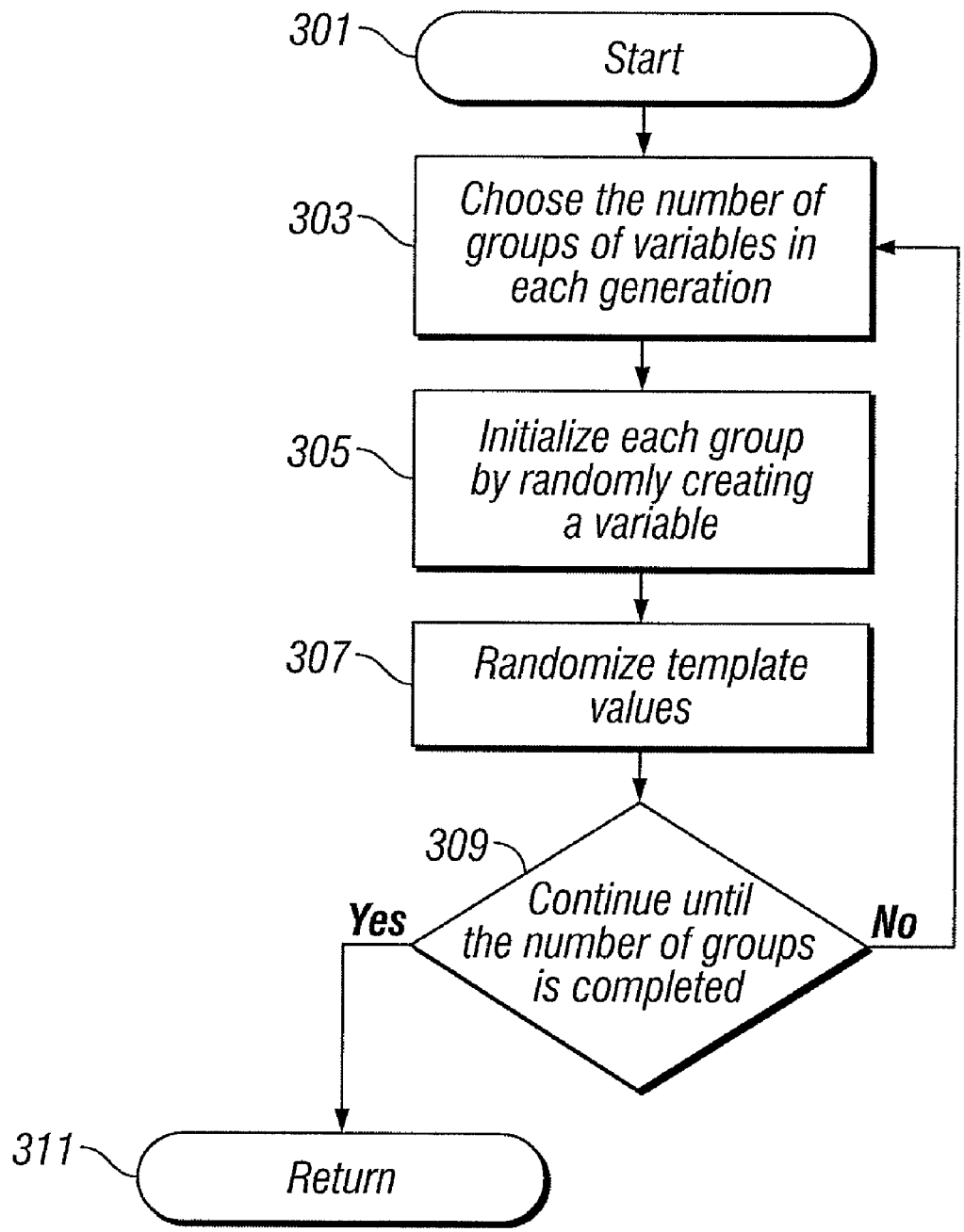
FIG. 3 is a high-level block flow diagram illustrating the creation of groups in accordance with an embodiment of the invention.
Figure 4:
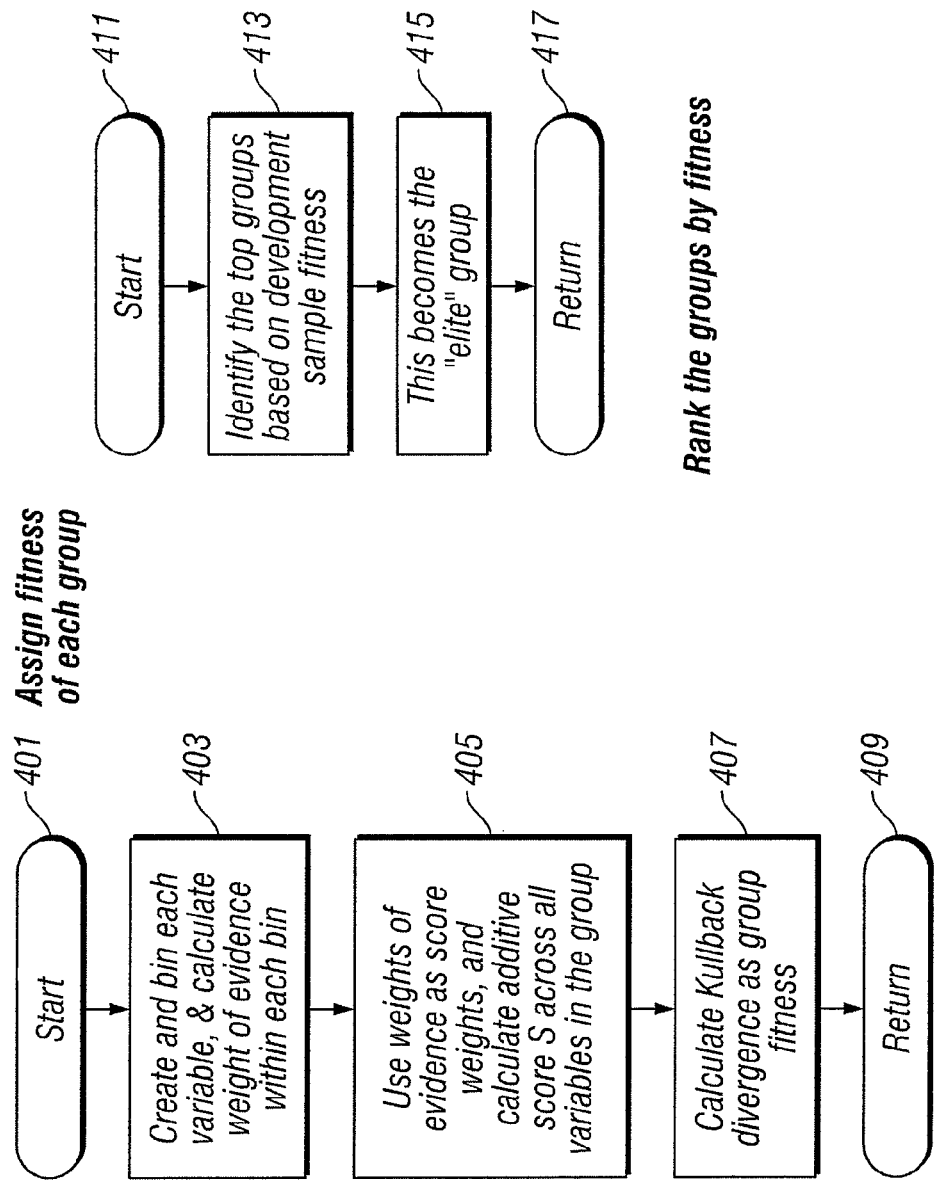
FIG. 4 is a high-level block flow diagram illustrating the assignment of fitness and ranking in accordance with an embodiment of the invention.

FIG. 3 is a high-level block flow diagram illustrating the creation of groups in accordance with an embodiment of the invention. Random group creation starts 301 and progresses by steps:

1) Choose the number of groups of variables in each generation 303.

2) Initialize each group by randomly creating a single variable 305.

3) For each parameter in this template, randomly pick a value from 1 to the max value for that parameter 307.

4) Continue until the number of groups is completed 309 returning 311 when all variables have been value randomized.

Determining Fitness

Figure 5:
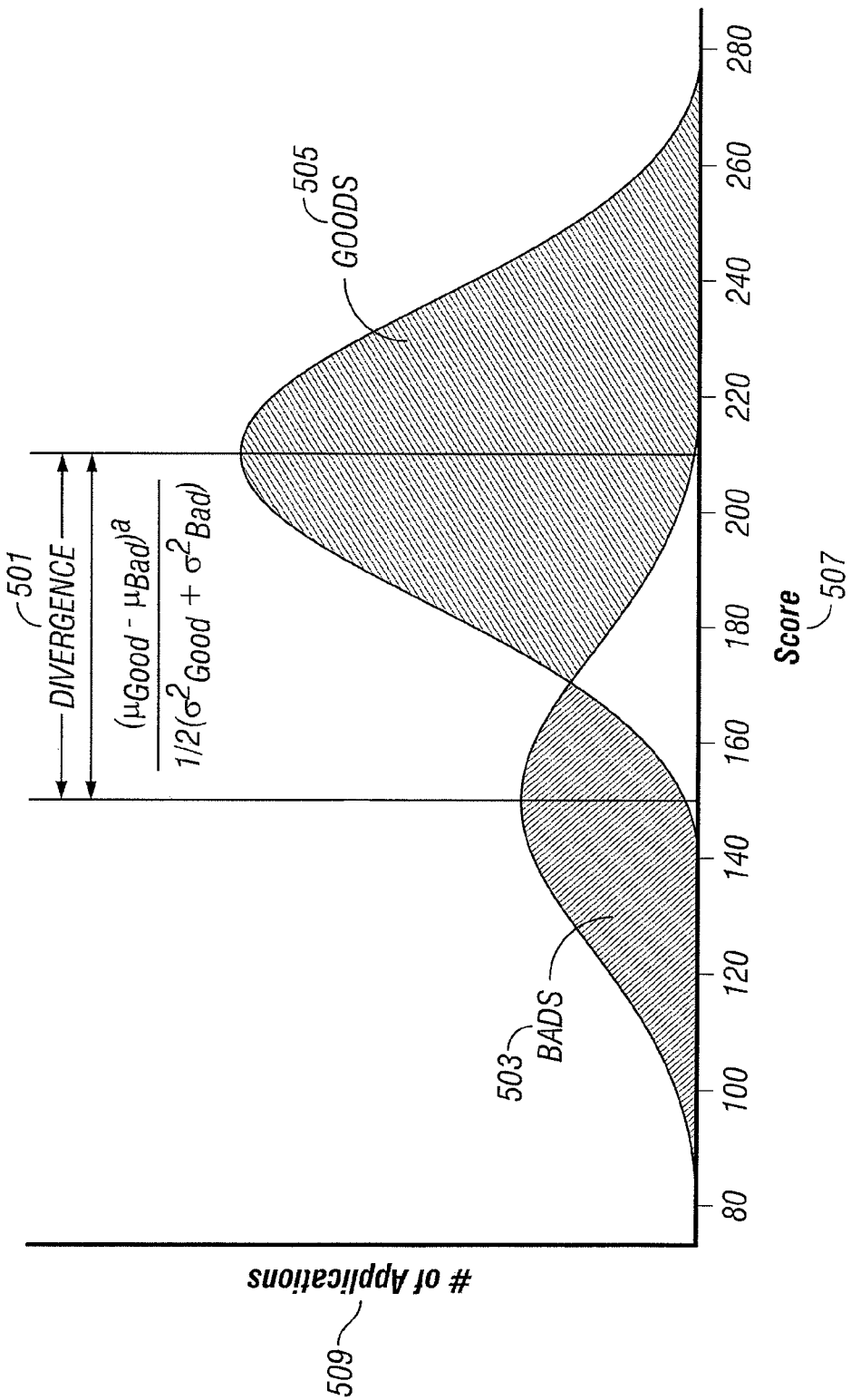
FIG. 5 is a graph diagram illustrating the Data Spiders scorecard by divergence of a naïve Bayes score in accordance with an embodiment of the invention.
Figure 6:
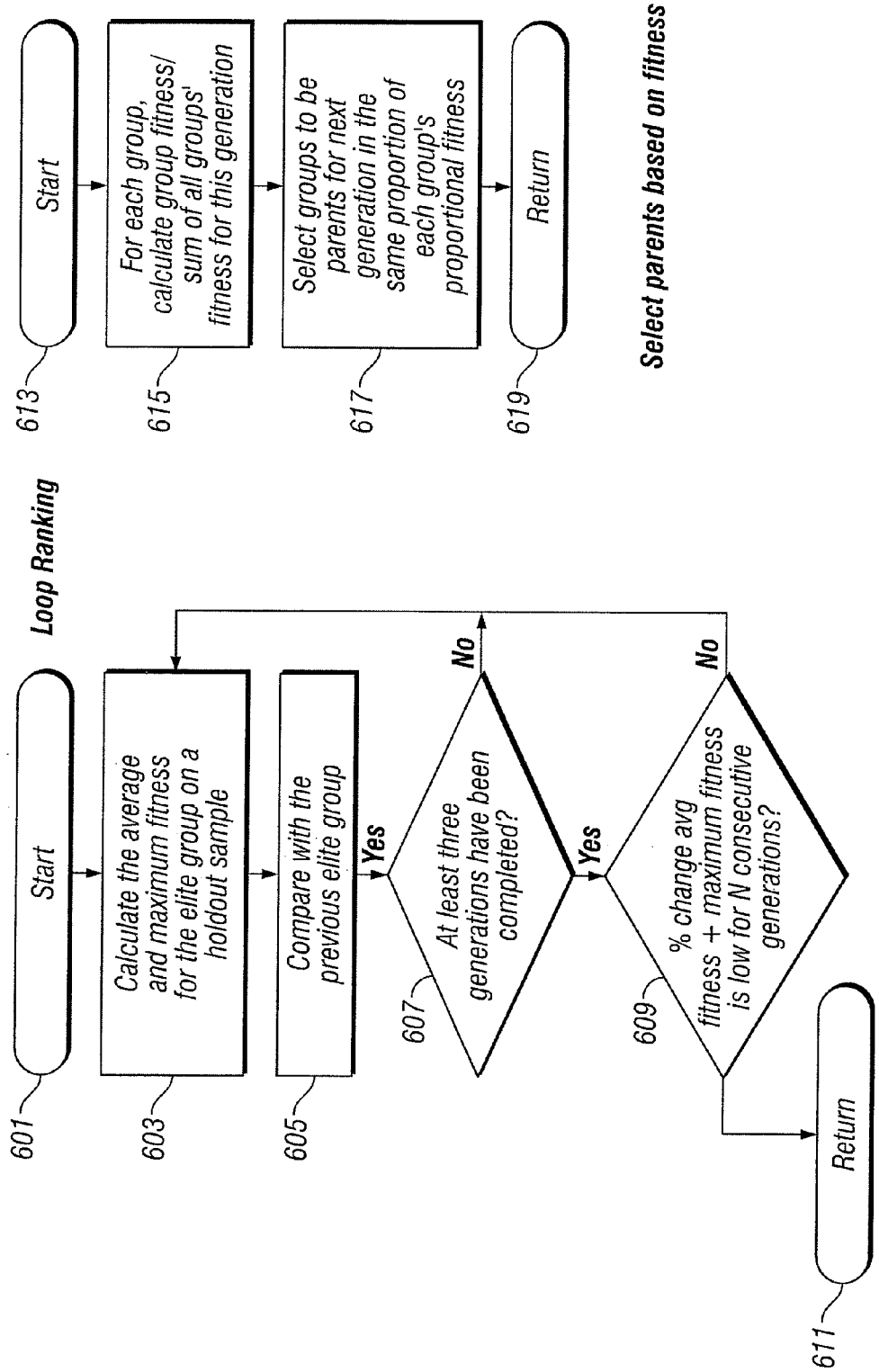
FIG. 6 is a high-level block flow diagram illustrating the ranking of groups by fitness and creation of parent groups in accordance with an embodiment of the invention.

The scorecards comprise this portion of the genetic search and use naïve Bayes models, using the predictors discovered from the summary variable templates. Fitness in each data spiders scorecard is measured by the divergence of a naïve Bayes score, as illustrated in FIG. 5.

Scorecards are created for each group or template. Rather than generate all possible transaction summary variables for each template, data spiders generate populations of scorecards made up of characteristics of that type, evolving those populations toward increasing fitness where the score is a naïve Bayes score, FIG. 5 (507), and the fitness is measured by the divergence of that score, FIG. 5 (505).

Assignment of Fitness

Start 401 a naïve Bayes model calculation. Create and bin each variable using naïve Bayes, then calculate weight of evidence within each bin 403, where:

$$WoE_i = \log_e\left(\frac{P[\text{bin}_i \mid \text{outcome}_1]}{P[\text{bin}_i \mid \text{outcome}_2]}\right) \quad (1)$$

Naïve Bayes classifiers work in many complex real-world situations. An advantage of the naïve Bayes is that it requires a small amount of training data to estimate the means and variances of the variables necessary for classification. Because independent variables are assumed, only the variances of the variables for each class need to be determined.

Weights of evidence are used as score weights, and are calculated additive score S across all variables in the group 405:

$$S = \sum_{i=1}^{I} \sum_{j=1}^{J} x_{i,j} \beta_{i,j} \quad (2)$$

Calculate Kullback divergence and use as group fitness 407:

$$\text{Divergence} = \frac{\left(\mu_{\text{outcome}_1} - \mu_{\text{outcome}_2}\right)^2}{\frac{1}{2}(\sigma^2_{\text{outcome}_1} + \sigma^2_{\text{outcome}_2})} \quad (3)$$

where:

$\mu_{\text{outcome}_i}$ = mean of score $S$ for outcome $i$, $\sigma^2_{\text{outcome}_i}$ = variance of score $S$ for outcome $i$ and return 409. The divergence 501 is the measure between the bined Goods 505 and Bads 503 median scores 507 for number of applications 509.

Rank the Groups by Fitness

Identify the top groups based on development sample fitness 413 and this becomes the elite group 415. Monitoring the fitness of the elite group on a holdout sample provides a stop criterion. Inside the loop, the elite group is promoted to the next generation of groups with no change, ensuring that the solution does not degrade.

After characteristics from each template have evolved, a final evolutionary search is done among the surviving characteristics for sets that jointly predict the target well. The evolutionary process is controlled by a genetic algorithm that evaluates the fitness of each scorecard, using that fitness to select which characteristics survive into the next generation.

Loop ranking 601, do until fitness of the top groups plateaus:

1) Calculate the average and maximum fitness for the elite group on a holdout sample 603.

2) Compare with the previous elite group 605.

3) Stop if
   At least three generations have been completed 607, or
   The % change in average fitness and maximum fitness is very low for a number of consecutive generations 609.

4) Start 613 selection of Parents based on fitness.

5) For each group, calculate group fitness/sum of all groups' fitness for this generation 615.

6) Select groups to be parents for next generation in the same proportion of each group's proportional fitness 617 and return 619 execution.

During the evaluation process, the very best scorecards, the elite set, are cloned and appear to the next generation. Additional scorecards are generated through selective breeding.

The genetic algorithm uses the divergence value of the individual cards in the population to determine which should be bred for the next generation. Selection is accomplished through the fitness proportional selection, which is analogous to a roulette wheel with a different color for each scorecard, where the number of slots of each color reflects the relative fitness of each card. New scorecards for the next generation are created from pairs of parent cards selected in this way. This is done for survival of the fittest, i.e. the more fit the group, the more we want the group to propagate.

Create Children 701

Figure 7:
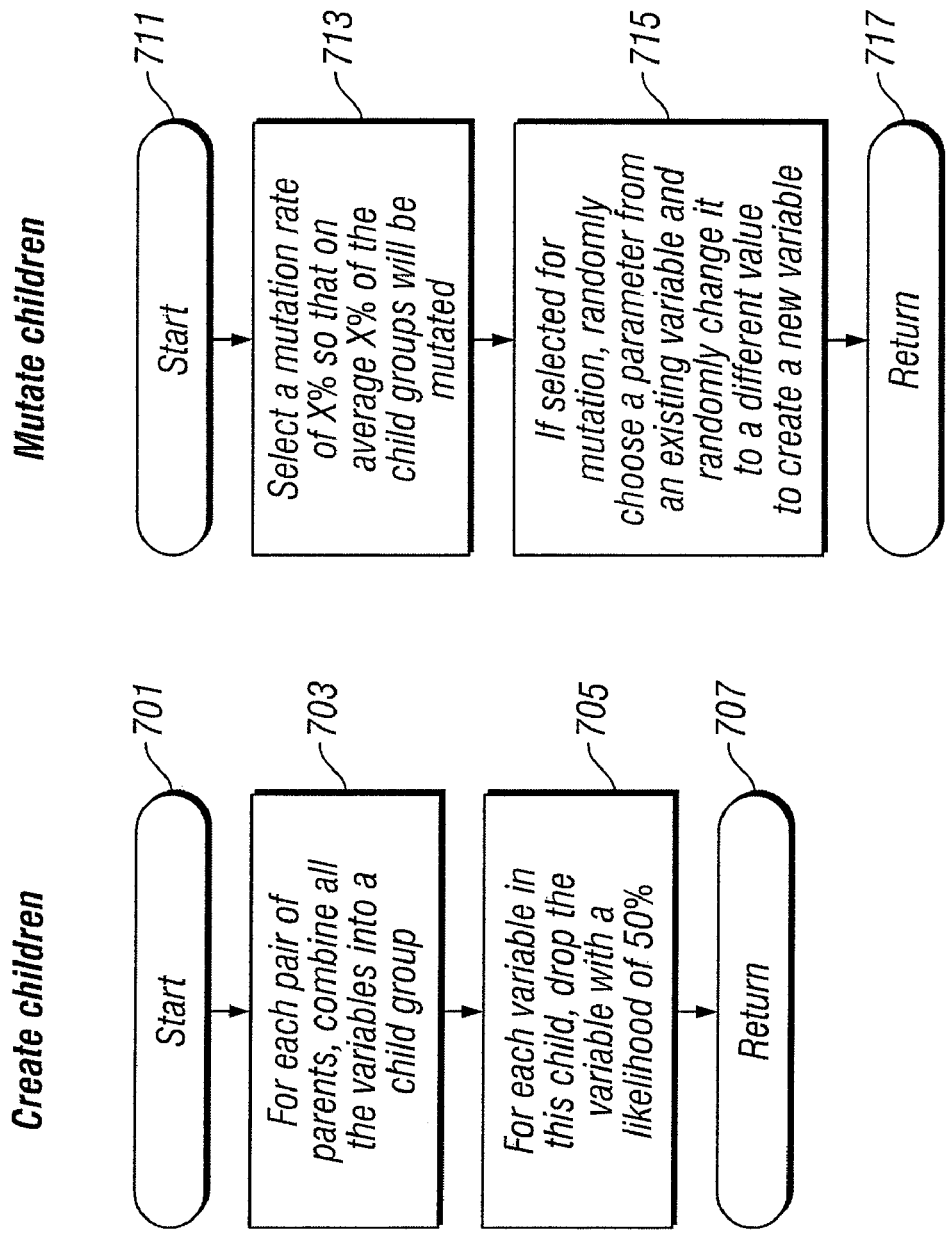
FIG. 7 is a high-level block flow diagram illustrating the creation of children groups in accordance with an embodiment of the invention.

FIG. 7 is a high-level block flow diagram illustrating the creation of children groups. Once each pair of parents are selected using proportional fitness, a child is created by splicing two parent scorecards together. In some cases the child is fitter than the parents through a combination of traits that make the parents relatively fit and that work well together. The children of those are less fit than their parents. This executes as:

1) For each pair of parents, combine all the variables into a child group 703;

2) For each variable in this child, drop the variable with a likelihood of 50% 705;

and returns 707 for the next step, mutation. This uniform crossover creates children similar to each parent but not an exact duplicate. It allows group size to evolve over time, and supports searching through new groups of variables, but it does not explore new variables. That is the part for mutation.

Mutate Children 711

Select a mutation rate of X % so that on average X % of the child groups is mutated 713.

Figure 8:
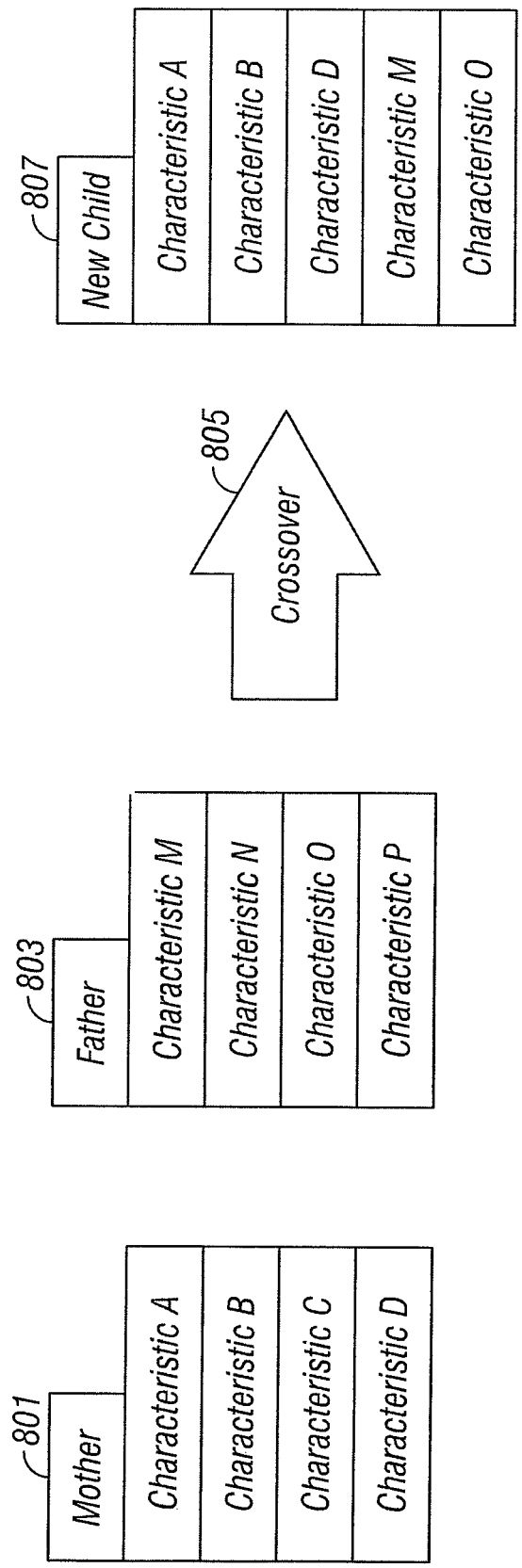
FIG. 8 is a block diagram illustrating the crossover parent to children groups in accordance with an embodiment of the invention.
Figure 9:
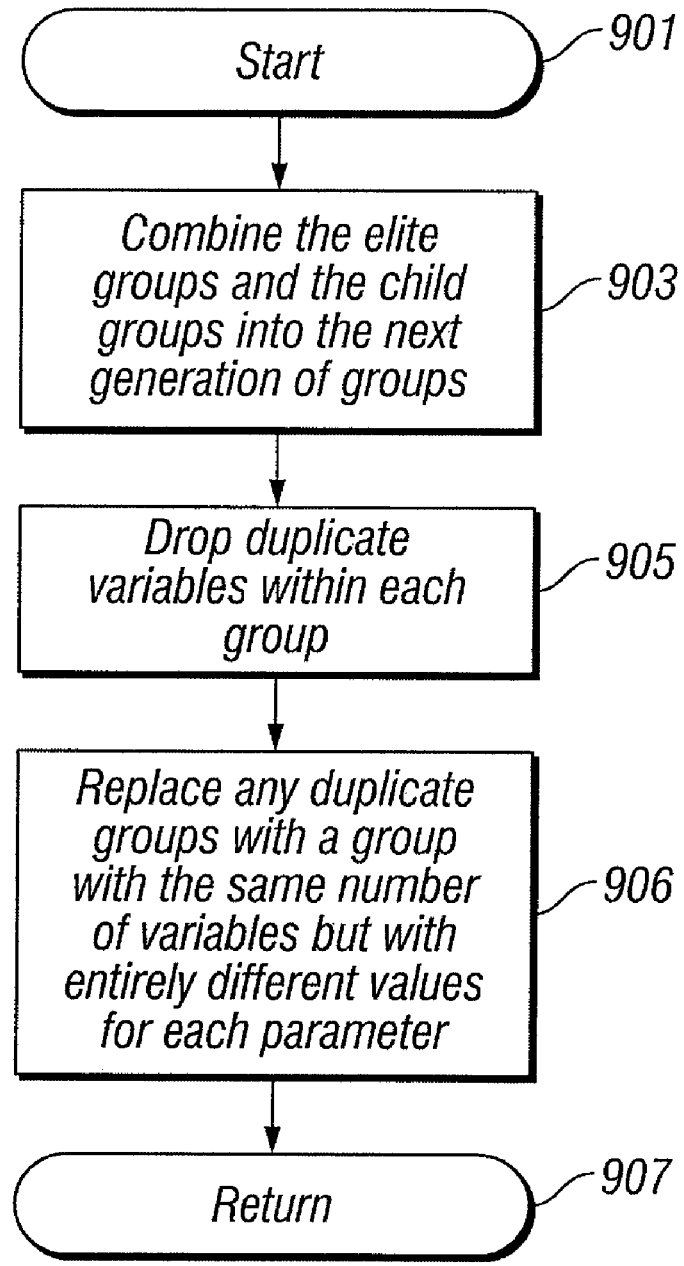
FIG. 9 is a high-level block flow diagram illustrating the merging of top groups with children groups in accordance with an embodiment of the invention.

If selected for mutation, randomly choose a parameter from an existing variable and randomly change it to a different value to create a new variable 715, then return 717. Mutation introduces more variation into the search, protects against incest, and allows for searching through new variables FIG. 8 is a block diagram illustrating the crossover parent to children groups. The mother 801 group characteristics combine 805 with the fathers 803 characteristics to create a new child 807 group with combined characteristics.

Merge top groups and children into next generation 901.

In this thread we:

1) Combine the elite groups and the child groups into the next generation of groups 903.

2) Drop duplicate variables within each group 905.

3) Replace any duplicate groups with a group with the same number of variables but with entirely different values for each parameter 906 and return 907.

De-duping groups defends against incest. Also, radical replacement expands number of variables explored and promotes population diversity.

Preparing to Use Data Spiders

Data spiders find transaction summary characteristics. In an embodiment of the invention, a front-end process separates the transactions data into a performance dataset and a predictive dataset. These use variables, and templates for sets of variables.

Performance Dataset

The performance data set contains one or more records for each entity, customer, or account. These are to be scored and may include the following exemplary fields:
   a rollup variable: a unique identifier at the customer or account level
   a matchkey variable: for event triggering, optional if clock triggering is used
   an observation date/time variable: for clock-triggered passes, i.e. the start time for a customers transactions variable, optional if clock triggering is used
   a binary target a continuous target variable: required for an evolve pass Predictive Dataset The predictive dataset contain historical transactions and associated attributes in the following fields:
   A matchkey variable: a unique identifier at the transaction level
   A rollup variable: the customer/account value
   A transaction date/time variable: the timestamp of the transaction
   A transaction order variable: used for sorting transactions within a rollup/transaction date combination when matchkey does not provide the desired ordering
   A product identifier variable: used for product-level templates
   Event variables: for templates that use events
   Amount variables: one or more for templates the use amounts Matchkey Variable FIG. 10 is a table showing clock trigger organization using matchkey 105 variables.

The matchkey variable 1005 must uniquely identify each record in the predictive dataset. Transactions are sorted by data spiders by rollup and descending transaction date-time 1001. In an embodiment of the invention, the matchkey 1005 can be used to capture the order 1007 of the transaction within a duplicate rollup/transaction 1003 date-time combination, with the smallest value representing the earliest transaction and the largest value representing the latest. In another embodiment, the matchkey variable can carry the burden of coding transaction order.

Triggers

Different predictive modeling applications have different requirements with respect to the trigger, which can be accounted for in data spiders by appropriate setting triggering by on: 1) event, in-authorization; 2) event, post-authorization; or 3) clock trigger.

Event Triggering, In-Authorization

This is used when a decision needs to be made about the current transaction as quickly as possible, and real-time speed is critical. A historical value has likely been calculated already and stored in the database. The current transaction information can still be used in real-time, then combined with the historical value based on previous transactions to calculate a final value. Event in-authorization triggering forces all characteristics to be of the form where the current transaction is excluded from history.

The observation date on the performance record specified as a parameter is ignored, and the transaction date from the predictive record with a matchkey value corresponding to that on the performance dataset is used as the observation date.

Event triggering, post-authorization is used when there is time during the scoring phase to include the current transaction with the historical transactions. Real-time speed for characteristic evaluation is not as critical, so partial values do not need to be pre-calculated. This allows the data spiders to generate characteristics to be of either form, where the current transaction is included or excluded. The observation date on the performance record or the specified date, if present, is ignored, and the transaction date from the predictive record with a matchkey value corresponding to that on the performance dataset is used as the observation date.

Clock Triggering

The observation date need not be a date on the predictive dataset. Clock triggering forces the recency of each transaction to be calculated based on the observation date. Setting clock triggering automatically forces all variables to include the current transaction. The observation date may be either a single value for all performance records or a different value for each. Clock triggering ignores the matchkey on the performance dataset, if present. For event triggered passes, the matchkey value in the performance dataset links each rollup value to a specific predictor dataset record. This row is the trigger, and it is used to direct the algorithm to the start of the transaction records to use in the search for predictive new characteristics.

An illustration of a set of sample transaction records for the single rollup value 001 with a matchkey trigger is a transactional database containing purchase histories of one of then products. In the ten product types, there are four purchase types (purchase, discounted purchase, gift, and return) and five payment types (cash, check, store card, credit, and debit card). With seven summarization operators (recency, count, sum of amounts, average amount, minimum amount, maximum amount, standard deviation of amounts) and eight time periods (1 day, 1 week, 1 month, 2 months, 6 months, 12 months, 24 months, 48 months), over 10,000 potential characteristics can be generated. Many combinations are possible and thus pose a challenge solved by an embodiment of the invention. Thus, a summary characteristic predictive of the solution is an aspect of the invention.

Conclusion

The data spider implementation searches for optimal yet understandable transformations of hierarchical data to make decisions. These are automated methods, which focus on transforming data at single level, not at multiple levels. These not readily understandable transformations capture domain expertise in an easily transferable format.

Although the invention is described herein with reference to the preferred embodiment, one skilled in the art will readily appreciate that other applications may be substituted for those set forth herein without departing from the spirit and scope of the invention. For example, the various transaction and entities provided herein, the pseudo code examples; and use of source code is given only for purposes of example, and not by way of limitation. Embodiments of the application currently support computer programming applications for large transaction data mining for: Clickstream data for fraud, cross-sell, Retail sales records for offer strategies, Call detail records (CDRs) for churn prevention, Monthly masterfile snapshots for policy decisions, and Analytic Datamart design. Applications also perform well on solutions with a measurable fitness, such as Online Fraud detection, Direct mail cross-selling using promotional history and Online purchase prediction Accordingly, the invention should only be limited by the Claims included below.

The invention claimed is:

1. A computer implemented method of data mining transactional data through data spiders implementing genetic algorithms, comprising the steps of:
   programmatically creating groups of variables from parameterized transactional data;
   using a naïve Bayes model to calculate score cards for each group;
   determining group divergence by naïve Bayes scores and compiling scorecards quantifying the divergence, wherein divergence measures the ability of a naïve Bayes score to separate two outcome classes of a binary target variable;
   determining fitness of each group by the quantified divergence of the naïve Bayes score;
   ranking the groups by fitness, from divergence score;
   identifying elite groups based on top ranking groups;
   iteratively performing the following sequence of steps until the fitness measure of the pre-set top ranking number of groups does not substantively change, those steps comprising:
      selecting parent groups based on fitness, wherein parent groups are cloned elites from a previous iteration;
      creating children groups, wherein each children is a present iteration variable group combination of two parent groups;
      mutating children groups, wherein each mutating group comprises a pre-set fraction of children groups with at least one altered parameter value per group;
      merging the parent groups and children groups;
      assigning a fitness value of each group based on divergence value;
      ranking the groups by fitness values; and
      tagging the top ranking groups as elite groups to be promoted to the next iteration;

wherein groups of transaction variables using analogous genetic processes, iteratively valued, scored, and ranked for a particular mathematical score of fitness, progressively maintaining top ranking groups while introducing mutating groups results in an automated process of comprehensively mining the transaction data for predictors of a specified target objective; and outputting said predictors.

2. The method of claim 1, further comprising the steps of obtaining transactional data from a set of sources comprising databases, Internet web logs, industry bureau updates, internet transaction clearing houses, data repositories, and combinations thereof.

3. The method of claim 1, further comprising the step of grouping parameterized transaction data into variable templates, wherein templates have defined event type variables associated with transaction time-period type variables from an available pool class of customer attributes.

4. The method of claim 1, wherein the mathematical weighting function comprises a naïve Bayes calculation used in additive scoring across all variables for a group fitness, and the naïve Bayes scoring panelizes redundancy.

5. The method of claim 1, wherein the mathematical weighting function comprises a non-differentiable fitness function.

6. The method of claim 1, wherein the systematic and exhaustive variable search space spans a full transaction datastore.

7. The method of claim 1, further comprising the step of; programmatically creating groups of variables from a pool of available variable types.

8. The method of claim 1, further comprising the step of; programmatically creating groups of variables through the benefit of prior templates predictive within a solution space sought.

9. The method of claim 1, further comprising the step of; implementing at least one algorithms analogous to a genetic operation selected from the set of genetic operations consisting of natural selection, mutation, crossover, attribute promotion, and combinations thereof.

10. The method of claim 1, further comprising the step of; parameterizing transactions into variables grouped into variable templates.

11. The method of claim 1, further comprising the step of; automating variable creation into code class entities by forming grammars from transaction data with existing software tools, said grammars implementing lexical scanner and parser rules.

12. A computer program residing on a computer-readable media, said computer program for directing an informational technology system to systematically data mine transactional data through data spiders implementing genetic algorithms, comprising the steps of:
programmatically creating groups of variables from parameterized transactional data;
using a naïve Bayes model to calculate score cards for each group;
determining group divergence by naïve Bayes scores and compiling scorecards quantifying the divergence, wherein divergence measures the ability of a naïve Bayes score to separate two outcome classes of a binary target variable;
determining a fitness value of at least two groups by the quantified divergence of the naïve Bayes score;
ranking the groups by fitness values, from highest to lowest divergence;
identifying elite groups based on top ranking groups;
iteratively performing the following sequence of steps until the fitness measure of the pre-set top ranking number of groups does not change substantively, those steps comprising:
selecting parent groups based on fitness, wherein parent groups are cloned elites from a previous iteration;
determining and creating children groups, wherein at least two children groups comprise the present iteration variable group combination of two parent groups;
determining and mutating children groups, wherein at least one mutating group is a pre-set fraction of children groups with at least one altered parameter value per group;
merging the parent groups and children groups;
determining and assigning fitness values of at least two groups;
ranking the groups by fitness values; and
tagging the top ranking groups as elite groups to be promoted to the next iteration without further changes;
wherein groups of transaction variables using analogous genetic processes, iteratively valued, scored and ranked for a particular mathematical score of fitness, progressively maintaining top ranking groups while introducing mutating groups results in an automated process of comprehensively mining the transaction data for predictors of a specified target objective; and outputting said predictors.

13. A computer program residing on a computer-readable media as in claim 12, said computer program further comprising the step of;
obtaining transactional data from at least one source selected from a set of sources consisting of databases, Internet web logs, industry bureau updates, internet transaction clearing houses, data repositories, and combinations thereof.

14. A computer program residing on a computer-readable media as in claim 12, wherein the naïve Bayes calculation used in additive scoring across all variables for a group fitness panelizes redundancy.

15. A computer program residing on a computer-readable media as in claim 12, wherein the weighting function comprises a non-differentiable fitness function.

16. A computer program residing on a computer-readable media as in claim 12, further comprising the step of;
grouping parameterized transaction data into variable templates, wherein templates have defined event type variables associated with transaction time-period type variables from an available pool class of customer attributes.

17. A computer program residing on a computer-readable media as in claim 12, wherein the variable search space spans the full transaction datastore.

18. A computer program residing on a computer-readable media as in claim 12, further comprising the step of;
programmatically creating groups of variables from a pool of available variable types.

19. A computer program residing on a computer-readable media as in claim 12, further comprising the step of;
programmatically creating groups of variables through the benefit of prior templates predictive in a solution space sought.

20. A computer program residing on a computer-readable media as in claim 12, further comprising the step of;
implementing algorithms analogous to genetic operations.

21. A computer program residing on a computer-readable media as in claim 12, further comprising the step of;

implementing at least one algorithm analogous to genetic operations from the set of genetic operations consisting of natural selection, mutation, crossover, attribute promotion, and combinations thereof.

22. A computer program residing on a computer-readable media as in claim 12, further comprising the step of;
parameterizing transactions into variables grouped into variable templates, from a class of existing templates.

23. A computer program residing on a computer-readable media as in claim 12, further comprising the step of;
automating variable creation into a plurality of code class entities by forming grammars from transaction data with existing software tools, said grammars imposing lexical scanner and parser rules.

* * * * *